Jan. 14, 1969   F. N. HEHR   3,421,629
DOWNSPOUT DEBRIS TRAP
Filed Nov. 13, 1967
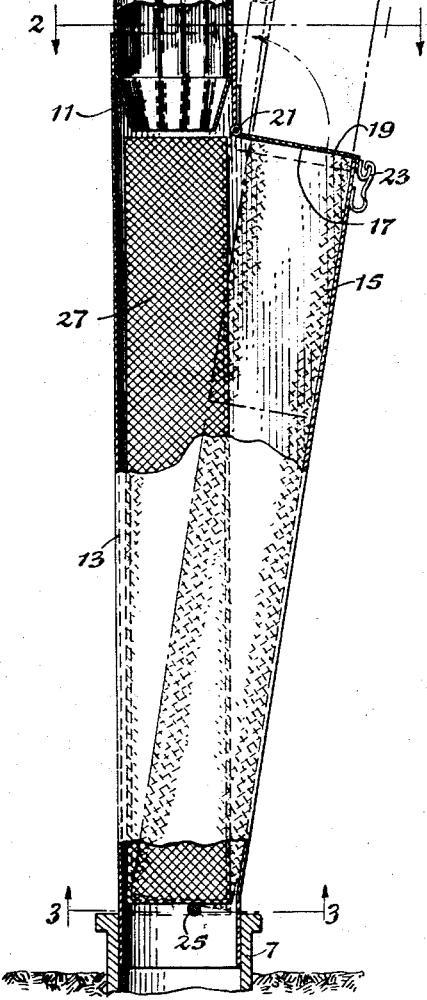
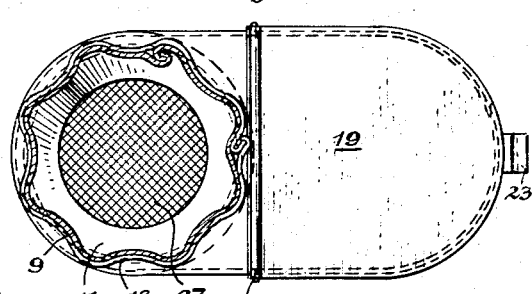
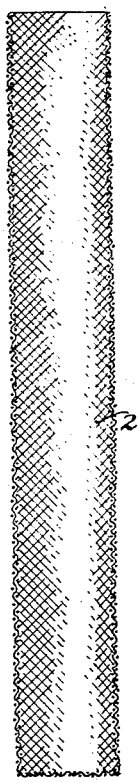
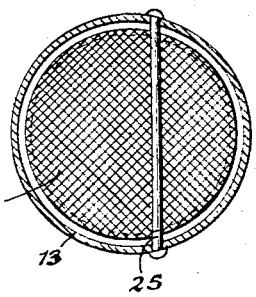
INVENTOR.
FREDERICK N. HEHR
BY
Bean & Bean
ATTORNEYS

United States Patent Office 3,421,629
Patented Jan. 14, 1969

3,421,629
DOWNSPOUT DEBRIS TRAP
Frederick N. Hehr, 61 Kilhoffer St.,
Buffalo, N.Y. 14211
Filed Nov. 13, 1967, Ser. No. 682,419
U.S. Cl. 210—232    2 Claims
Int. Cl. B01d 35/02

ABSTRACT OF THE DISCLOSURE

A downspout provided with a removable screen tubular trash collecting container, wherein the downspout is provided near its bottom with an outwardly flaring wall portion and a rest member; with the container normally supported on said rest in the main downspout, but adapted to be tilted outwardly at its top and removed by lifting through an opening in the top of the flaring wall portion.

*Brief summary of the invention*

This invention has to do with improved structure to better handle the perennial problem of trash, in the form of twigs and leaves, which collect in the gutters of structures and washes down the downspouts and into the soil pipes which extend into the ground. Eventually, the trash clogs the soil pipes so that rain water backs up and flows out on the surface of the ground which creates an undesirable condition.

A number of traps or strainers have been tried in connection with the gutters or downspouts to catch the trash and prevent it from reaching the soil pipes, but they usually present problems in easy access to, or removal of such traps or strainers for cleaning them of the accumulated debris.

The present invention combines a trim appearance in a downspout structure for enclosing a trap both in use and during its removal, so that the trap can be removed only by lifting it in a substantially vertical direction from the downspout whereby the trash contained in the trap will not be accidentally spilled during such removal.

A portion of the downspout is enlarged on one side in an upwardly and outwardly tapering manner to provide two positions for a tubular trap, one in which the trap is positioned in the main stream of the downspout, and the second in which the top of the trap can be tilted outwardly at its top to a limited degree and into the downspout enlargement to permit removal of the trap by lifting it through an opening formed in the top of the enlargement.

The foregoing concept is entirely lacking in the prior practices and other details and objects of the invention will appear from the detailed description in the following specification.

In the drawing:

FIG. 1 is a partially sectioned and cutaway front elevational view of my invention, showing the trash container in solid lines in its collecting position, and in dot-dash lines as partially removed from the downspout;

FIG. 2 is an enlarged view taken on line 2—2 of FIG. 1;

FIG. 3 is an enlarged view of the bottom of the container and its rest taken on line 3—3 of FIG. 1; and FIG. 4 is a vertical cross-section through the container.

My entire structure may be made of metal or other suitable materials, and in the drawing, 1 is part of a conventional gutter adapted to receive rain water flowing off the roof of a structure. Often the water becomes mixed with twigs, leaves and other debris.

Gutter 1 has as part thereof, a wide-mouth funnel-shaped connection 3 leading into the top of a tubular downspout 5 which may be of any desired cross-section; that is, rectangular, oval, or substantially cylindrical as shown in the drawing. The bottom of the downspout slips into a conventional soil pipe 7 which extends into the ground. The wide-mouth funnel connection between the gutter and the downspout reduces the possibility of clogging in that area.

The downspout of the invention as shown, is formed in two sections comprising an upper section 9 terminating in a funnel end 11 and a lower section 13. Lower section 13 is provided with an upwardly and outwardly flaring wall portion 15 forming at its top an opening 17 which may be provided with any suitable cover or lid. In the drawing, a lid 19 is hinged at 21, and provided with a snap catch 23, as shown.

Downspout section 13 has a rest member or pin 25 extending across it, and pin 25 is shown as positioned slightly toward the flaring wall portion to support a removable container 27 in the main stream of the downspout. Container 27 has an open top and screen side wall and bottom, and is slightly smaller in cross-section than the downspout cross-section so it may be normally positioned in the main stream of the downspout to trap any debris that may come down the downspout. The funnel end or portion 11 of the downspout serves to guide the flow material into the top of the container.

The area of the flaring wall section or portion 15 at its top, is such that upon hinging the cover 19 open, a person's hand may be inserted in the top opening to tilt the top of the container 27 outwardly and lift it upwardly as shown in dot-dash lines in FIG. 1, to remove the container and thereafter, permit it to be upended to drop the accumulated debris out of it. It will be apparent that the container, during removal from the downspout, is limited in its tilt by the semi-incasing flaring wall portion so that there is no possibility of the debris accidentally falling out.

While there has been shown and described only the preferred form of the invention, it is obvious that variations thereof are possible and are intended to be covered by the appended claims.

What I claim as my invention is:

1. A downspout for structures having a collecting gutter and said downspout being provided with a trash collecting container wherein the improvement comprises, providing the downspout with an upwardly and outwardly flaring wall portion and an opening in the top of said flaring wall portion, said downspout also having a nonflaring wall portion disposed in a facing spaced relationship to said flaring wall portion, a cover for said opening, a horizontally disposed rest member positioned in the flow path of said downspout at a point adjacent the bottom of said flaring wall portion and nearer the flaring wall portion than the nonflaring wall portion, a tubular container having an open top and screen side and bottom walls adapted to be positioned in the flow path of said downspout with its bottom resting on said rest member, said container when positioned in said flow path having the center of gravity thereof located between said rest member and the nonflaring wall portion of said downspout, and after removal of said cover said container being adapted to be removed from said flow path of said downspout by tilting said container with respect to said rest member to move said container outwardly into said flared wall portion and to position said open top adjacent said flaring wall portion top opening, and thereafter lifting said container upwardly through said top opening.

2. The improved downspout as described in claim 1, wherein said rest member is in the form of a pin arranged transversely of said flow path and disposed intermediate the center of said flow path and said bottom of said flaring wall portion.

References Cited

UNITED STATES PATENTS

| | | | |
|---|---|---|---|
| 423,767 | 3/1890 | Hough | 210—448 |
| 522,667 | 7/1894 | Minnemeyer | 210—447 |
| 541,183 | 6/1895 | Schermerhorn | 210—447 |
| 617,032 | 1/1899 | Martin | 210—447 X |
| 834,431 | 10/1906 | Williams | 210—448 |
| 960,649 | 6/1910 | Levy | 210—447 X |
| 1,044,601 | 11/1912 | Thiem | 210—447 |
| 2,419,501 | 4/1947 | Pinto | 210—452 X |
| 2,446,256 | 8/1948 | Young | 210—448 X |
| 2,532,388 | 12/1950 | Batt | 210—447 |
| 2,595,538 | 5/1952 | Rausch | 210—447 X |

REUBEN FRIEDMAN, *Primary Examiner.*

C. M. DITLOW, *Assistant Examiner.*

U.S. Cl. X.R.

210—447, 448, 477